No. 771,762. PATENTED OCT. 4, 1904.
J. A. BECHTOL & W. H. BUCKE.
SAFETY WASHER AND NUT FOR VEHICLE AXLES.
APPLICATION FILED DEC. 20, 1902.
NO MODEL.

James H. Bechtol, and
William H. Bucke, Inventors

Witnesses
Howard D. Orr
N. F. Riley

By
E. G. Siggers
Attorney

No. 771,762.

Patented October 4, 1904.

UNITED STATES PATENT OFFICE.

JAMES A. BECHTOL AND WILLIAM H. BUCKE, OF EATON, OHIO.

SAFETY WASHER AND NUT FOR VEHICLE-AXLES.

SPECIFICATION forming part of Letters Patent No. 771,762, dated October 4, 1904.

Application filed December 20, 1902. Serial No. 136,007. (No model.)

*To all whom it may concern:*

Be it known that we, JAMES A. BECHTOL and WILLIAM H. BUCKE, citizens of the United States, residing at Eaton, in the county of Preble and State of Ohio, have invented a new and useful Safety Washer and Nut for Vehicle-Axles, of which the following is a specification.

The invention relates to improvements in safety washers and nuts for vehicle-axles.

The object of the present invention is to improve the construction of safety washers and nuts for vehicle-axles and to provide a simple, inexpensive, and efficient construction of great strength and durability adapted to be readily applied to vehicle-axles and capable of effectually preventing washers and nuts from being accidentally unscrewed by the backward movement of the wheels.

A further object of the invention is to provide a device of this character having a washer which will be locked against rotation and to provide a swivel connection between the same and the axle-nut in which the rotary element will be completely housed to provide a dust-proof bearing. Also the invention has for its object to provide a safety washer and nut in which the parts may be easily constructed and readily assembled.

With these and other objects in view the invention consists in the novel construction and arrangement of parts hereinafter fully described, illustrated in the accompanying drawings, and particularly pointed out in the claim hereto appended, it being understood that changes in the form, proportion, and minor details of construction within the scope of the claim may be made without departing from the spirit or sacrificing any of the advantages of the invention.

Figure 1:
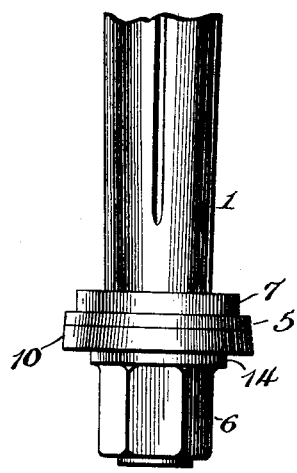
Figure 2:
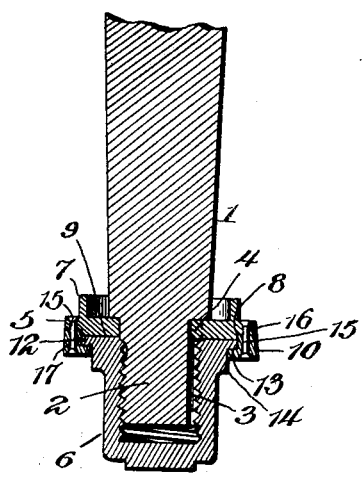
Figure 3:
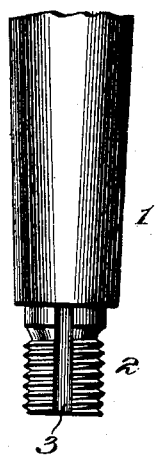
Figure 4:
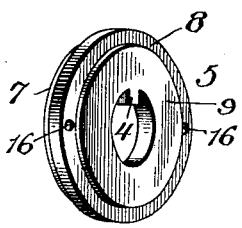
Figure 5:
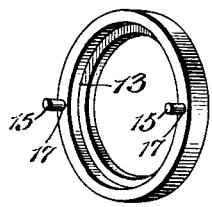
Figure 6:
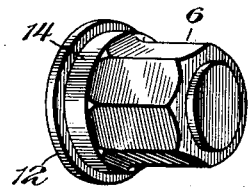

In the drawings, Figure 1 is a plan view of a portion of the spindle provided with a safety washer and nut constructed in accordance with this invention. Fig. 2 is a longitudinal sectional view of the same. Fig. 3 is a plan view of the end of the spindle. Fig. 4 is a detail perspective view of the washer. Fig. 5 is a similar view of the cap-ring. Fig. 6 is a detail perspective view of the nut.

Like numerals of reference designate corresponding parts in all the figures of the drawings.

1 designates a spindle provided at its threaded end 2 with a longitudinal groove 3, arranged to receive an inwardly-extending lug or projection 4 of a safety-washer 5, which is held by the lug against rotation, whereby the washer and an axle-nut 6 are effectually prevented from being accidentally unscrewed by the retrograde rotation of a vehicle-wheel incident to backing a vehicle. The lug extends inward from the washer 5 into the central circular opening thereof, and the said washer is provided at one face with a projecting flange 7 to receive the outer end of the axle-box of a wheel in the usual manner.

The other face of the washer is provided with an annular recess 8, arranged at the periphery of the washer and forming a central projecting body portion 9, which is adapted to fit within a cap-ring 10 and to receive and fit against the inner end of the axle-nut 6. The axle-nut 6 is provided at its inner end with an annular flange 12, forming a continuation of the inner face of the nut and adapted to extend outward from the body portion of the nut into the cap-ring 10. The cap-ring 10 is provided at its inner face with an annular recess 13 of a depth sufficient to receive the annular flange 12 of the axle-nut and the projecting body portion of the washer. The nut is provided adjacent to its flange 12 with an annular or cylindrical portion 14, which fits snugly within the opening of the cap-ring at the outer face thereof. By this construction the flange 12 is housed within the cap-ring between the same and the washer, and these two parts form a dust-proof casing for the inner end of the nut.

The cap-ring is rigidly secured to the washer by means of rivets 15 or other suitable fastening devices passing through registering perforations 16 and 17 of the washer and the cap-ring. By this construction the parts may be quickly assembled. The nut, which is polygonal, may be of any desired form, and in placing the device on the threaded end of the spindle the inwardly-extending lug of the washer is fitted in the longitudinal groove 3 of the spindle and the nut is then rotated.

As the nut is screwed on the threaded end of the spindle the washer and the cap-ring are advanced on the same and are thereby carried to the inner end of the threaded portion to arrange the washer in proper engagement with a wheel. After the nut has been screwed on the axle it cannot become accidentally unscrewed by the rotation of the vehicle-wheel, and the washer is locked against rotation by the groove 3 and the projection or lug 4.

It will be seen that the safety washer and nut are exceedingly simple and inexpensive in construction, that they possess great strength and durability, and that they are effectually prevented from becoming accidentally unscrewed by the backward movement of a vehicle-wheel. It will also be seen that the inner end or bearing portion of the axle-nut is housed within the casing formed by the washer and the cap-ring to form a dust-proof bearing and that the washer has an engaging face similar in construction to the ordinary washer and is adapted to receive leather or metal washers in the usual manner for taking up or receiving the wear. Also it will be apparent that as the projecting body portion of the axle-nut fits within the annular recess of the cap-ring the latter is held against lateral movement, and the fastening devices for securing the cap-ring to the axle-nut are relieved of strain.

What is claimed is—

A device of the class described, comprising a washer having an inwardly-extending lug or projection for engaging a groove of a spindle and provided at one of its faces with a peripheral recess forming a central projecting portion, a nut provided with an inner cylindrical portion and having an annular flange at its inner end, the latter being fitted against the central projecting portion of the washer and being of the same diameter as such portion, an exterior cap-ring fitted on the cylindrical portion of the nut and provided at its inner face with an annular recess receiving the annular flange of the nut, the latter being extended through the cap from the inner face thereof, and the outer peripheral portion of the cap being extended beyond the flange of the nut and fitting within the peripheral recess of the washer, and fastening devices piercing the cap-ring and the washer and located beyond the nut and disposed longitudinally of the spindle, substantially as described.

In testimony that we claim the foregoing as our own we have hereto affixed our signatures in the presence of two witnesses.

JAMES A. BECHTOL.
WILLIAM H. BUCKE.

Witnesses:
  MICHAEL CAHILL,
  A. M. CRISLER.